UNITED STATES PATENT OFFICE.

CHARLES S. LOCKWOOD, OF NEWARK, NEW JERSEY, ASSIGNOR TO HYATT ROLLER BEARING DIVISION, UNITED MOTORS CORPORATION, OF HARRISON, NEW JERSEY, A CORPORATION OF NEW YORK.

BALL-CAGE FOR ROLLER-BEARINGS.

1,297,579.                 Specification of Letters Patent.         Patented Mar. 18, 1919.

Original application filed January 11, 1918, Serial No. 244,352. Divided and this application filed November 15, 1918. Serial No. 262,648.

*To all whom it may concern:*

Be it known that I, CHARLES S. LOCKWOOD, a citizen of the United States, residing at 496 Clinton avenue, Newark, county of Essex, and State of New Jersey, have invented certain new and useful Improvements in Ball-Cages for Roller-Bearings, fully described and represented in the following specification and the accompanying drawings, forming a part of the same.

This invention is a division of application No. 244,352 filed by me January 11, 1918 for patent on composite roller bearing, and it relates to a special means for retaining balls in a concave ballrace upon a hub, so that the assemblage of the balls and hub may be maintained when fitting up the roller bearing and when applying it to the frame or structure with which it is used.

In this invention, the ballrace has both its edges elevated above the bottom of the ballrace so as to prevent the balls from moving longitudinally upon the hub when embraced by the casing of the bearing.

The inner edge of the ballrace is arranged to resist end-thrust when imposed upon the balls, and the outer edge of the ballrace is formed with a cylindrical seat to sustain a cage, which retains the set of balls upon the hub when apart from the casing.

The cage has a conical sheet-metal body formed with holes fitted to the outer segments of the balls. The outer edge of the body is formed with a flat disk-like flange which turns freely upon the seat on the hub, and the inner edge of the body has a slit extended into each of the holes, so that the intermediate tongues are rendered elastic, to permit the springing of the tongues over the outer segments of the balls. The body of the cage is made conical to clear the outer ballrace. The holes embrace the outer sides of the balls loosely, thus permitting their turning in the ballrace while retaining them upon the hub.

In my prior application, the claims related to a bearing including a set of cylindrical rolls.

The claims of the present application relate solely to the means for holding the balls in the ballrace when the hub is removed from the casing.

Figure 1:
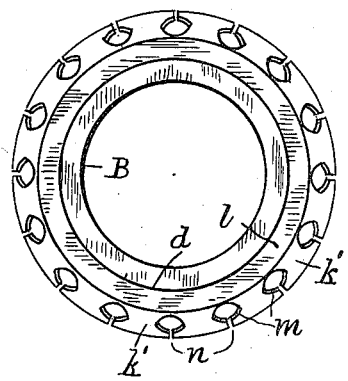
Figure 2:
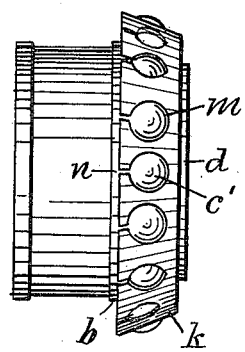
Figure 3:
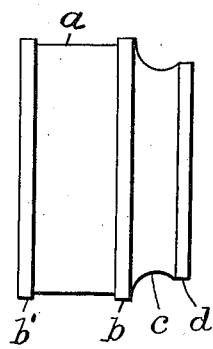
Figure 4:
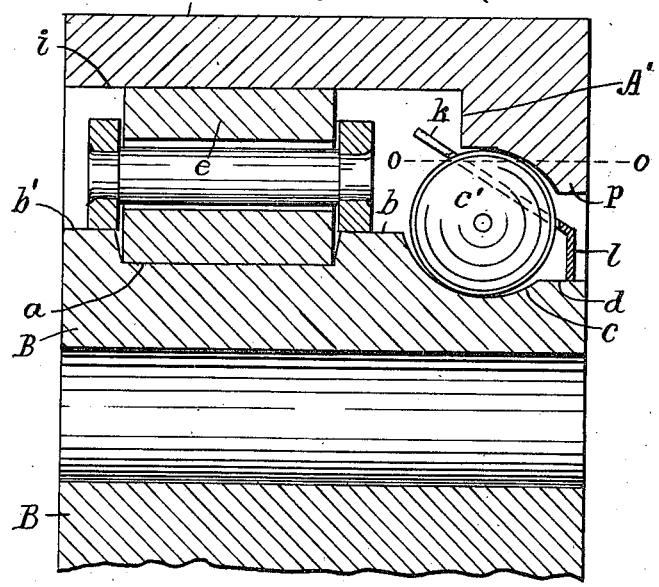

The invention will be understood by reference to the annexed drawing, in which Figure 1 is an end view of a hub having a cage fitted thereon; Fig. 2 is a side view of the same; Fig. 3 is a side view of the hub alone; and Fig. 4 is a longitudinal section upon the center line at one side of a roller-bearing embodying the improvement.

In the present drawing, the hub B is shown formed at one end with a cylindrical seat $a$ having flanges $b$, $b'$ at its edges, and at the opposite end with an annular concave groove $c$ forming a depressed ballrace, both edges of which extend above the bottom of the ballrace so as to prevent the balls $c'$ from longitudinal motion upon the hub when confined thereon by the cage.

The outer rim $d$ of the race is made of cylindrical form to sustain the cage, and the inner lip $b$ of the ballrace is shown with ample surface to resist end-thrust.

The casing A is shown formed in one end with a cylindrical seat $i$ to embrace the outer sides of the rolls $e$, and in the other end with an inwardly projecting collar A' having an annular lip $p$ forming a one-sided race fitted to the balls upon the outer quarter of their surface. The seats upon the lips $b$ and $p$ bear upon opposite quarters of the balls to resist the end-thrust. Upon the inner side, the collar is adapted to clear the balls, so that the hub and balls may be fitted into or withdrawn longitudinally from the casing.

Any thrust movement of the balls upon the hub in the direction of the arrow $j$ in Fig. 4 is resisted by the contact of the balls with the lip $b$ upon the hub.

The cage has an annular conical body $k$ formed of sheet-metal of lesser diameter than the outer peripheries of the balls, and perforated with a series of holes $m$ one for each of the balls, through which the outer segment of the ball projects when the balls are assembled within the cage.

The cage-body is provided at the outer end with a flat disk-like flange $l$ adapted to turn loosely upon the seat $d$.

A slit $n$ is extended from the opposite end of the cage into each of the holes, thus forming tongues $k'$ intermediate to the slits which are free to spring outwardly.

This permits the cage to be slipped over the entire series of balls at once when they are in the groove $c$, the tongues springing inwardly when a hole is located over each ball, thus securing the balls to the hub while permitting them to turn freely in the ballrace.

The body of the cage is made conical, to facilitate the application of the cage to the balls, such conical shape also causing the body of the cage to fully clear the lip $p$ upon the collar $A'$ of the casing.

With the conical form, the outer sides of the holes $m$ lie near the center line of the balls, and the inner sides near the top of the balls. This is apparent by the dotted line $o$—$o$ in Fig. 4, which is extended across the top of the ball at a level with the inner edge of the hole, thus showing the amount that the tongue $k'$ would have to yield in crowding over the top of the ball.

With this form of cage, the balls and hub can be handled as a unit, and the loss of any of the balls wholly prevented in handling these parts after they are assembled and before the casing is applied thereto. The structure also permits the cage to be readily applied to or removed from the balls in manufacturing, assembling and adjusting the parts, or in cleaning or repairing the same after they have been put into use.

Having thus set forth the nature of the invention what is claimed herein is:

1. In a roller bearing, the combination, with a hub having a concave annular ballrace, of a sheet-metal annular cage having a series of holes in its periphery one to receive the outer segment of each ball, and a slit extended from the edge of the cage into each hole to permit the springing of the intermediate tongues over the balls when located in the ballrace, the cage being thus adapted to hold the balls in the ballrace, and to retain them movably upon the hub.

2. In a roller bearing, the combination, with a hub having a concave annular ballrace with a cylindrical seat adjacent to its outer edge, of a set of balls fitted to the said ballrace, and a sheet-metal annular cage having a flat disk-like flange at one edge fitted to turn upon the said cylindrical seat, and the cage-body provided with a series of holes one to receive the outer segment of each ball, the body having a slit extended from its edge into each hole to form intermediate elastic tongues which permit the springing of the body over the balls when located in the ballrace.

3. In a roller bearing, the combination, with a hub having a concave annular ballrace with a seat at the inner edge of the ball-race elevated to resist end-thrust, and a cylindrical seat at the outer edge of the ballrace to sustain a cage, of a sheet-metal conical cage-body having a flat disk-like flange to run upon the hub at the outer edge of the ballrace, and such cage-body having a series of holes one to receive the outer segment of each ball, and a slit extended from the larger edge of the conical body into each of said holes to permit the springing of the intermediate tongues over the balls when located in the ballrace.

4. In a roller bearing, the combination, with a hub having a concave annular ballrace with a seat at the inner edge of the ballrace elevated to resist end-thrust, and a cylindrical seat at the outer edge of the ballrace to sustain a cage, of a sheet-metal annular cage having a flat disk-like flange to run upon the outer seat of the hub, and such cage-body having a series of holes one to receive the outer segment of each ball, and a slit extended from the inner edge of the body into each hole to permit the springing of the intermediate tongues over the balls, and a casing having an inwardly projecting collar provided with a ball-race fitted to the balls upon the outer quarter of their surface.

In testimony whereof I have hereunto set my hand.

CHARLES S LOCKWOOD